United States Patent [19]

Pizano et al.

[11] Patent Number: 6,101,274

[45] Date of Patent: *Aug. 8, 2000

[54] METHOD AND APPARATUS FOR DETECTING AND INTERPRETING TEXTUAL CAPTIONS IN DIGITAL VIDEO SIGNALS

[75] Inventors: Arturo Pizano, Belle Mead; Farshid Arman, Hamilton; Daniel Conrad Benson, Lawrenceville; Remi Depommier, Plainsboro, all of N.J.

[73] Assignee: Siemens Corporate Research, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,970

[22] Filed: Jun. 2, 1997

Related U.S. Application Data

[63] Continuation of application No. 08/365,277, Dec. 28, 1994, abandoned.

[51] Int. Cl.[7] .................................................... G06K 9/36
[52] U.S. Cl. ........................................... 382/176; 382/292
[58] Field of Search ..................................... 382/174, 176, 382/180, 199, 200, 256, 257, 270, 292

[56] References Cited

U.S. PATENT DOCUMENTS

| | | | |
|---|---|---|---|
| 4,503,556 | 3/1985 | Scherl et al. | 358/462 |
| 5,249,050 | 9/1993 | Zato | 358/147 |
| 5,379,130 | 1/1995 | Wang et al. | 358/462 |
| 5,392,365 | 2/1995 | Steinkirchner | 358/462 |
| 5,459,587 | 10/1995 | Fukushima | 358/462 |
| 5,467,410 | 11/1995 | Bloomberg | 358/462 |
| 5,471,239 | 11/1995 | Hill et al. | 348/155 |

OTHER PUBLICATIONS

Ohya, et al., "Recognizing Characters in Scene Images", *IEEE Trans on Pattern Analysis* . . . , vol. 16 No. 2 pp. 214–220, Feb. 1994.

Nakamura et al., "An Optical Character Recognition System for Industrial Applications: TOSEYE—1000", *Proc. Intl. Wkshp on Industrial Applns* . . . , 1987, pp. 364–368.

Takatoo et al., "Gray Scale Image Processing Technology Applied to a Vehicle License Number Rec. System", *Proc Intl Wkshop on Industrial Applications* . . . , 1987, pp. 76–79.

Howington, "Automated License Plate Reading", *Advanced Imaging*, vol. 4, No. 8, 1989 pp. 46–50.

*Primary Examiner*—Andrew W. Johns
*Attorney, Agent, or Firm*—Adel A. Ahmed

[57] ABSTRACT

A computer-implemented method for the identification and interpretation of text captions in an encoded video stream of digital video signals comprises sampling by selecting frames for video analysis, decoding by converting each of frames selected into a digitized color image, performing edge detection for generating a grey scale image, binarizing by converting the grey scale image into a bi-level image by means of a thresholding operation, compressing groups of consecutive pixel values in the binary image, mapping the consecutive pixel values into a binary value, and separating groups of connected pixels and determining whether they are likely to be part of a text region in the image or not.

24 Claims, 10 Drawing Sheets

1) SPORTS/TRANSPARENT

2) SPORTS/TRANSLUCID

3) SPORTS/TRANSPARENT

4) SPORTS/OPAQUE

5) SPORTS/OPAQUE

6) NEWS/TRANSPARENT

7) NEWS/TRANSPARENT

8) NEWS/TRANSPARENT

A) SAMPLING/DECODING

B) EDGE DETECTION

C) BINARIZATION

D) COMPRESSION

E) CONNECTED COMPONENT

F) PROJECTION

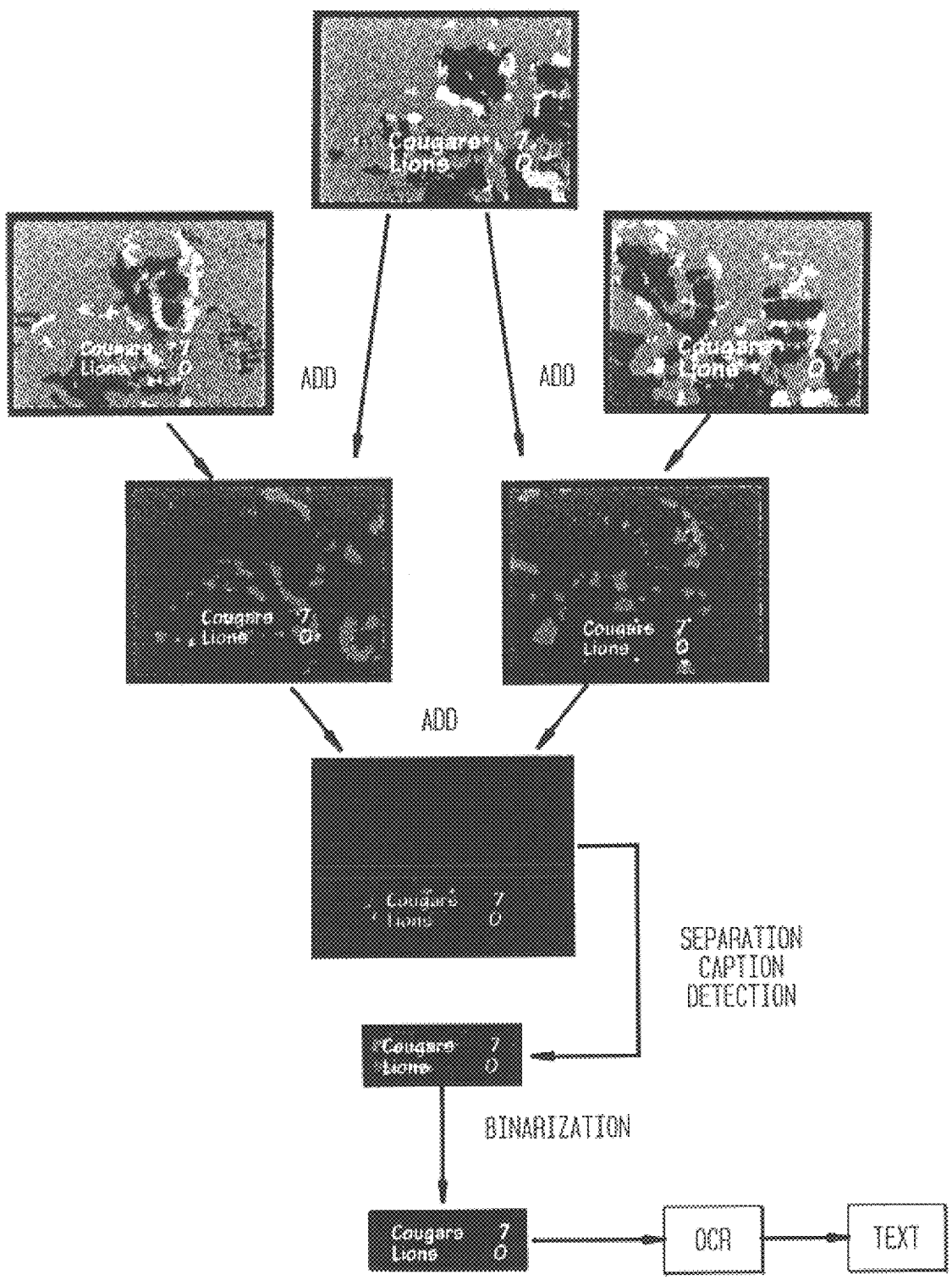

METHOD AND APPARATUS FOR DETECTING AND INTERPRETING TEXTUAL CAPTIONS IN DIGITAL VIDEO SIGNALS

CROSS-REFERENCE TO RELATED APPLICATION

This is a continuation of Ser. No. 08/365,277 filed Dec. 28, 1994, now abandoned.

BACKGROUND OF THE INVENTION

The present invention relates to the detection and interpretation of textual captions in video signals and, more particularly, to the identification and interpretation of text captions in digital video signals.

Text captions, or more simply, captions, are commonly used in domains such as television sports and news broadcasts, to convey information that complements or explains the contents of the audio and video information being presented. For example, captions might present game scores and player names in sporting events, or places, situations, and dates in newscasts. FIG. 1 illustrates typical captions found in television broadcasts.

The "text captions" herein referred to should be distinguished from the "closed-captions" used, for example, in broadcast programs to assist the hearing impaired and other audiences interested in live textual transcripts of the words spoken in the sound channel of a broadcast. These captions are transmitted in a separate channel of the signal and are "overlaid" into the screen display of a television receiver by means of a special decoder. The captions herein addressed are textual descriptions embedded in the video signal itself.

It is herein recognized that an automatic caption detector can be used to address the following two principal problems in digital video management. The first problem relates to indexing—captions can be interpreted with an optical character recognition (OCR) system and used to generate indexes into the contents of the video., e.g. names of persons, places, dates, situations, etc. These indexes serve as references to specific videos or video segments from a large collection. For example, a person could request clips of a particular sports star or when a certain politician appears, or about a certain place. The second problem relates to segmentation—captions can be used to partition the video into meaningful segments based on the visual cues they offer to the viewer. In FIG. 2a, for example, captions were used to segment a video of an interview including a number of individuals. Using the browser one can quickly identify the person of interest and begin playing the corresponding segment (FIG. 2b).

In both cases the availability of knowledge about specific domains increases the usefulness of automatic caption detection. For example, in basketball games captions are regularly used to report the score of the game after every field-goal or free-throw. The ability to identify and interpret these captions can then be used to generate triplets of the form (time, TeamAScore, TeamBScore), which could latter be used to answer queries such as "show me all the segments of the game where TeamB was ahead by more than 10". Similarly, they can be used to create a score browser which would enable a person to move directly to specific portions of the video; see FIG. 2c.

The present invention is intended to be implemented by programmable computing apparatus, preferably by a digital computer. Thus, operational steps herein referred to are generally intended to signify machine operations In the detailed description of the invention that follows, features of the invention will be disclosed for enabling the detection, interpretation and classification of textual captions. Definitions are introduced and an outline of the methodology provided, followed by a disclosure of a caption detection algorithm and its application in the context of the invention.

As hereinbefore discussed, captions in the present context are those textual descriptors overlaid on a video by its producer. More specifically, captions are considered to exhibit the following characteristics. Captions do not move from frame to frame, i.e., they remain in the exact same location in each frame regardless of what is happening in the rest of the scene. Captions remain on the screen for at least a minimum period of time, i.e., they will appear in a plurality of consecutive frames. This is important because it enables sampling of the video to detect captions, and because the redundancy can be used to improve the accuracy of the method.

Captions are intended to be read from a distance. Thus, there are minimum character sizes that can be utilized in making a determination as to whether a video segment contains text.

It is herein recognized that non-caption text may appear in video. For example, street signs and advertisements will typically appear in outdoor scenes. Text is also often found in commercial broadcast material. In both cases if one or more of the aforementioned characteristics is violated (e.g., the text in a street sign may move in a fast action shot), the text will not be detected in accordance with the present invention.

SUMMARY OF THE INVENTION

In accordance with an aspect of the invention, a computer-implemented method for the identification and interpretation of text captions in an encoded video stream of digital video signals, the method comprises sampling by selecting frames for video analysis; decoding by converting each of frames selected into a digitized color image; performing edge detection for generating a grey scale image; binarizing by converting the grey scale image into a bi-level image by apparatus of a thresholding operation; compressing groups of consecutive pixel values in the binary image; mapping the consecutive pixel values into a binary value; and separating groups of connected pixels and determining whether they are likely to be part of a text region in the image or not.

In accordance with another aspect of the invention, the sampling is at a sampling rate fixed at 1 frame per N, where N is the number of consecutive frames in which the same caption is expected to appear.

In accordance with another aspect of the invention, the decoding uses one of JPEG encoding and MPEG.

In accordance with another aspect of the invention, the format of the resulting color image is a 24-bit RGB format and the compressing groups is performed eight at a time.

In accordance with another aspect of the invention, the mapping of the pixel levels is performed by apparatus of a test wherein during this step, a binary edge image of a frame, which size is defined to be WIDTH×HEIGHT, is converted into an image of size WIDTH/8×HEIGHT by compressing each byte in the original image (8 continuous pixels) into a binary value in accordance with predetermined criteria.

In accordance with another aspect of the invention, the criteria comprise a) 2<# of white pixels<6; and b) at least 2 of the 4-connected neighbors are 1. The purpose of the compression operation is two-fold: first, it reduces the amount of data to be processed; and second, it highlights areas of the image with a high edge density.

In accordance with an aspect of the invention, a step of taking a binary image as input and producing a table of connected-components is formatted as follows:

| Component ID | EnclosingRectangle | Dimensions | Density |
| --- | --- | --- | --- | where Component ID is an integer, Enclosing rectangle are the coordinates of the smallest rectangle containing all the pixels in the component (minX, minY, maxX, maxY), dimensions are measurements of the width, height and area of the enclosing rectangle, and density is the ratio of black pixels, which are associated with edges, in the component.

In accordance with another aspect of the invention, a step of determining whether a connected component is likely to contain edges associated with text or not, the step comprises the steps of:

(a) a geometric test, comparing the width, height, and area of the component against predefined minima and maxima, and discarding the component if any of the conditions is violated, (b) a content test applied to connected components that pass the geometric test, comparing the density of the component against predefined upper and lower bounds, as verifying that a minimum number of vertical white runs, corresponding to the gaps that occur between letters, exist.

In accordance with another aspect of the invention, the method comprises the steps of:

projecting black pixels contained in connected components that passed the geometric and content tests into the Y-axis of the image, thereby producing a projection pattern; and testing the resulting projection pattern to determine if its vertical runs, defined as sequences of consecutive lines having counts greater than zero, exceed a minimum height of the characters being sought in the caption.

In accordance with another aspect of the invention, the computer-implemented method for the identification and interpretation of text captions includes the step of defining the binary image, and its corresponding video frame, as having a caption if and only if it has at least one run satisfying the minimum text height condition.

In accordance with another aspect of the invention, the computer-implemented method for the identification and interpretation of text captions includes the step of confirming whether a collection of frames previously determined to have captions is further processed to confirm the result by the steps of:

defining N to be a frame determined to have a caption;

applying the decoding, edge detection and binarization steps above to frames N−D/2 and N+D/2;

combining resulting images with a binary image of N using an AND operation so as to result in two new binary images in which some of the edges associated with the individual frames have been removed, but those associated within text remain;

applying the compression, connected component analysis and projection evaluation steps above to each of the two new binary images;

determining a frame to have a caption, if and only if, either one, or both of the two new images is determined to have a caption.

In accordance with a further aspect of the invention, a computer-implemented method for the identification and interpretation of text captions in an encoded video stream of digital video signals, comprises: sampling by selecting frames for video analysis; decoding by converting each of frames selected into a digitized color image; separating each the digitized color image into three color images corresponding to three color planes; performing edge detection on each of the color planes for generating a respective grey scale image for each of the color planes; applying a thresholding image to each of the grey scale images so as to produce three respective binary edge images; combining the three binary edge images to obtain a single combined binary edge image; compressing groups of consecutive pixel values in the combined binary image; mapping the consecutive pixel values into a binary value; and separating groups of connected pixels and determining whether they are likely to be part of a text region in the image or not.

In accordance with still a further aspect of the invention, the digitized color image is separated into three 8-bit color images corresponding to the three color planes.

In accordance with still a further aspect of the invention, the three color planes are respectively red, green, and blue (RGB).

In accordance with a further aspect of the invention, a computer-implemented method for the identification and interpretation of text captions in a video stream wherein the frame sequence is compressed, comprises the steps of:

determining whether the frame number divided by a predetermined number N is an integer, discarding non-integers;

decoding compressed frames so as to result in uncompressed frames;

detecting edges so as to derive a corresponding gray scale image;

binarizing the gray scale image so as to derive a binary image;

compressing the binary image so as to derive a compressed binary image; and performing a connected component analysis.

In accordance with still a further aspect of the invention, the connected components analysis is carried out by computing connected components using a standard 4-neighbor connectivity text.

In accordance with still a further aspect of the invention, each the computed connected component is subjected to two sets of tests involving its geometric properties and contents.

In accordance with still a further aspect of the invention, the geometric tests involve minimum and maximum boundaries on a respective connected component's width, height and area.

In accordance with still a further aspect of the invention, the content tests, applied to an area in the binary image following edge detection corresponding to the connected component, include upper and lower boundaries on the proportion of black pixels contain therein, and a threshold on the number of vertical zero-runs, defined as collections of one or more columns in which no black pixels occur.

In accordance with still a further aspect of the invention, the computer-implemented method for the identification and interpretation of text captions comprises the steps of:

separating out connected components that passed the tests; and projecting values of corresponding pixels in the binary image following edge detection into the vertical axis of the image so as to result in a projection pattern.

In accordance with still a further aspect of the invention, the computer-implemented method for the identification and interpretation of text captions, comprises the step of:

testing the projection pattern to determine if it contains runs that exceed a given threshold and thereby determine if a caption is present.

BRIEF DESCRIPTION OF THE DRAWINGS

The invention will be more fully understood from the following detailed description of preferred embodiments, in conjunction with the Drawing, in which

FIGS. 6–10 show flow chart representations, useful in gaining a fuller understanding of the invention.

DETAILED DESCRIPTION

Figure 1:
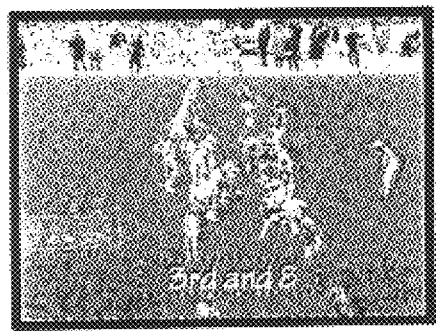
FIG. 1 shows sample captions as related to the subject matter of the present invention.
Figure 1:
Figure 1:
Figure 1:
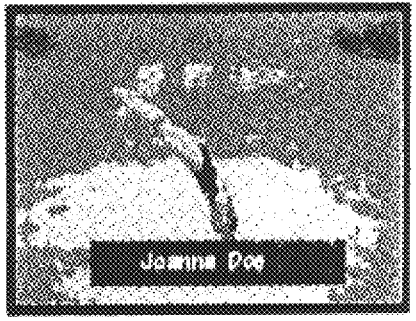
Figure 1:
Figure 1:
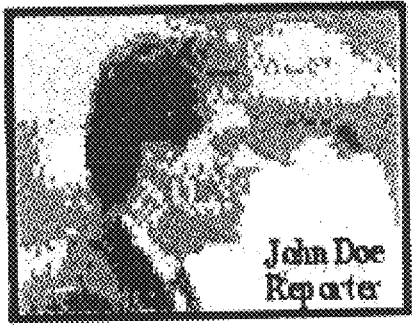
Figure 1:
Figure 1:
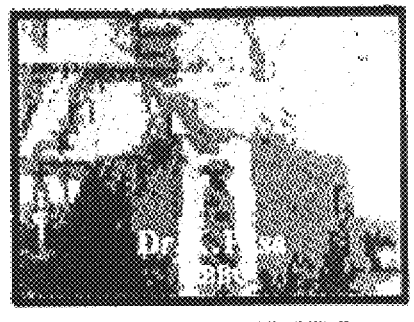
Figure 2A:
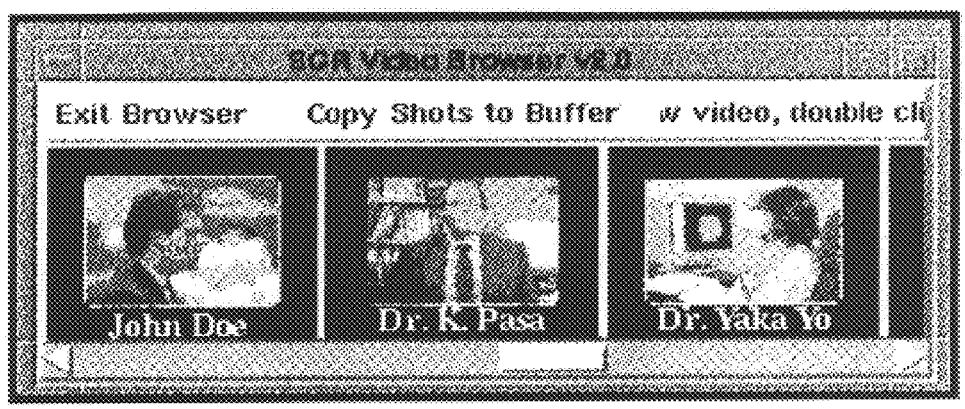
FIG. 2 shows an example of the use of captions for video browsing.
Figure 2B:
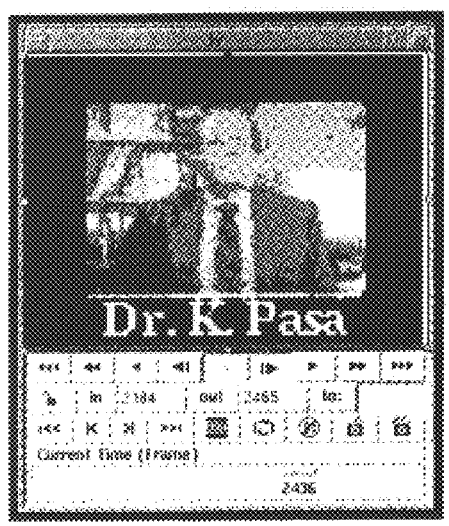
Figure 2C:
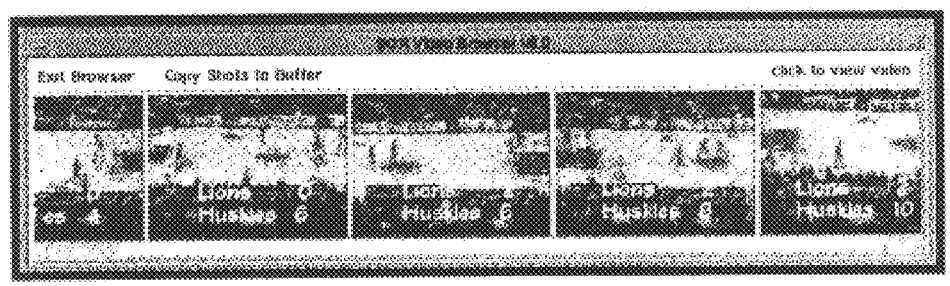

Three types of captions are herein recognized based on the type of background used to highlight the text:

Opaque background: the caption is printed on top of a solid block that completely obscures the scene (e.g., captions 4 and 5 in FIG. 1)

Translucid background: the caption is printed on top of translucid background that obscures but does not eliminate the scene (e.g., caption 2 in FIG. 1).

Transparent background: the caption is printed directly on top of the scene (captions 1, 3, 6, 7 and 8 in FIG. 1).

Such a classification is useful because identifying captions where there is no background requires additional processing, as will become apparent in the course of the present description of the invention and, more particularly, in the description of the algorithm and its application in the context of the invention.

In accordance with invention, the processing of digital video to detect and interpret text captions is carried out in two phases. First, frames in the video that contain text captions are identified. Then these captions are separated from the rest of the image. Each step is described separately below.

The objective of the caption detection phase is to identify the collection of video frames that contain text captions. The task is accomplished in two steps as follows:

initial detection during which the algorithm determines if a particular frame has a caption; and confirmation where neighboring frames are examined to confirm the presence of a caption.

The initial detection step involves generating intermediate binary representations of video frames (pre-processing) then determining whether it contains a caption.

With regard to sampling, the initial detection step of the algorithm is designed to use information contained in a single frame. Thus it is possible to sample the video at given intervals to determine if a caption is present. The size of the sampling rate is a function of the time the captions are expected to be present in the video. The inventors have found that the shortest captions appear to be active for at least two seconds, which translates into a sampling rate of 1/60 if the video is digitized at 30 frames per second.

Frames selected during the sampling process are decoded and converted into individual color images. In accordance with the present exemplary embodiment, the system uses motion JPEG (Joint Photographic Experts Group) video, but MPEG (Moving Pictures Experts Group) or other formats can be used, given an appropriate frame decoder. In accordance with the preferred embodiment of the invention, the preferred representation of the color image is a 24-bit RGB (red-green-blue) format. The use of other color representations or depths would require slight changes to the algorithms.

The first step performed in the processing of an individual frame is edge detection. In the invention, advantage is taken of the availability of color information by applying edge detection in each separate color plane and then combining the results during the binarization step. The process has proven particularly useful in dealing with transparent-background captions in which the letters of the caption blend with the rest of the scene. The edge detection technique used involves taking the Pythagorean sum of two Sobel gradient operators at 90 degrees to each other. The algorithm is described "Digital Image Processing" by Gonzalez and Wintz, chapter 7, and implemented in the set of operations made available with the portable bitmap (PBM) file format used in this project.

Figure 3:
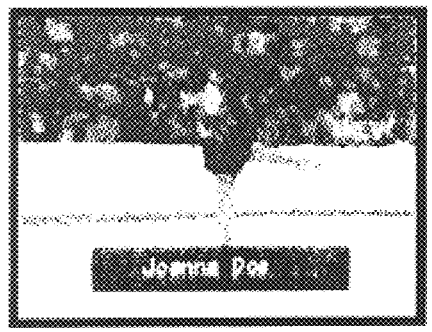
FIG. 3 shows caption detection in accordance with the present invention.
Figure 3:
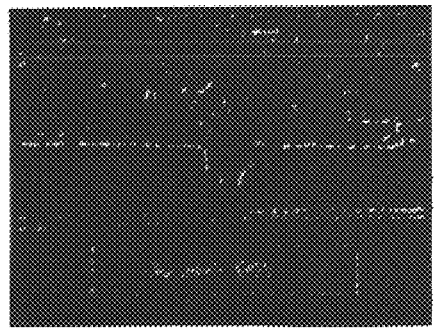
Figure 3:
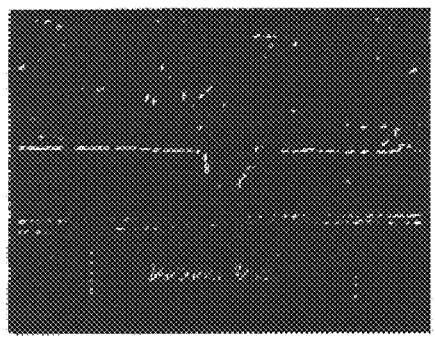
Figure 3:
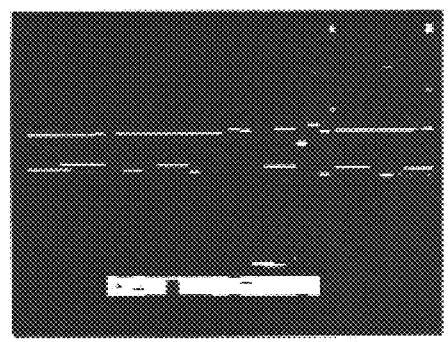
Figure 3:
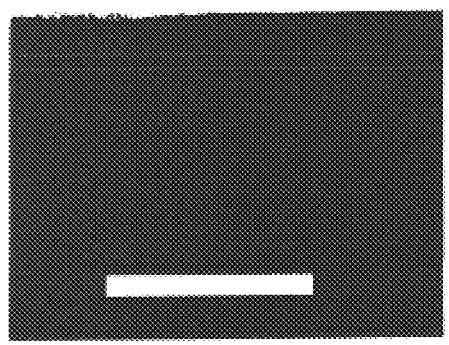
Figure 3:
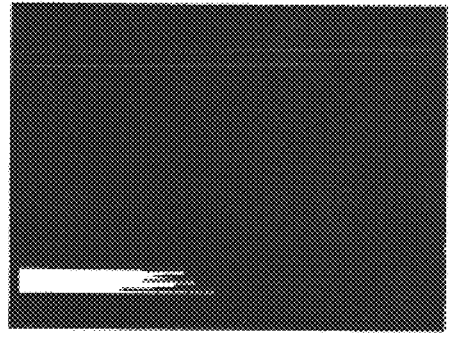

The gray scale images obtained in the edge detection step are binarized and combined into a single binary edge image. The process involves threshholding and OR-ing the image. FIGS. 3a–c illustrates the pre-processing tasks.

During analysis, the following tasks processing steps are performed.

Compression—during this step the binary edge image of a frame, which size is defined to be WIDTH×HEIGHT, is converted into an image of size WIDTH/8×HEIGHT by compressing each byte in the original image (8 continuous pixels) into a binary value using the following criteria:

a) 2<# of white pixels<6; and b) at least 2 of the 4-connected neighbors are 1. The purpose of the compression operation is two-fold: first, it reduces the amount of data to be processed; and second, it highlights areas of the image with a high edge density.

FIG. 3d illustrates a compressed image corresponding to that of FIG. 3c.

Given a compressed image the next step is to separate connected components and determine if they are likely to be text. Connected components are computed using the standard 4-neighbor connectivity text. Each connected component is then subjected to two sets of tests involving its geometric properties and contents. Geometric tests involve minimum and maximum boundaries on the connected component's width, height and area (minimum width, maximum width, minimum height, maximum height, minimum area, maximum area, minimum density, minimum black pixels, maximum black pixels). Content tests, applied to the area in the original binary edge detection image corresponding to the connected component, include upper and lower boundaries on the percentage of black pixels it contains, and a threshold on the number of vertical zero-runs, defined as collections of one or more columns in which no black pixels occur. The reason for the latter test is to account for the separation that exists between the text characters.

FIG. 3e shows the components that remain after applying the tests to the compressed image of FIG. 3d. The threshold values used by way of example are as follows.

| minimum width | 3 | maximum height | 40 | min. black pixels | 0.33 |
| maximum width | 40 | minimum area | 16 | max. black pixels | 0.66 |
| minimum height | 10 | maximum area | 640 | | |

It is noted that these values were set for a frame consisting of 240 lines of 320 pixels.

The final analysis task involves separating the connected components that passed the test and projecting the values of the corresponding pixels in the original binary edge image into the vertical axis of the image; see FIG. 3f. The resulting projection pattern is then tested to determine if it contains runs that exceed a given threshold. This test is based on the observation that shapes corresponding to text will contain a high number of edges concentrated in an area having approximately the height of the expected text.

The caption detection described above uses the color and shape information contained in each individual frame. In accordance with a further aspect of the invention, motion information is utilized to increase the overall accuracy (recall rate) of the method. The basic premise for this work is the fact that captions will remain in the same portion of the video while the background changes and thus it is possible to effectively remove background noise by combining the edges of two (or more) neighboring frames.

Figure 4:
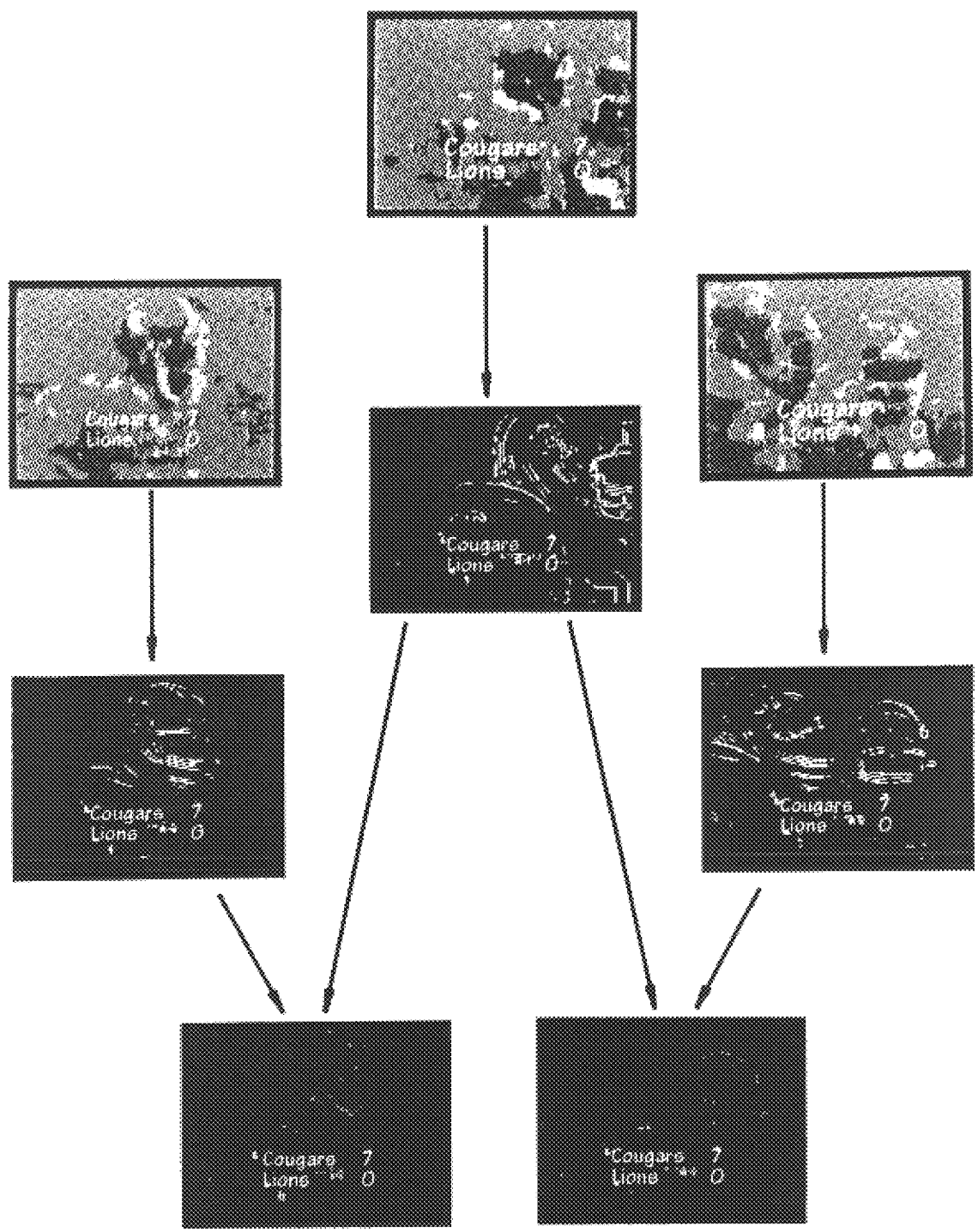
FIG. 4 shows a confirmation step in accordance with the present invention.

Let N be the frame being analyzed, E(N) be the corresponding edge image, and D the minimum number of contiguous frames a caption is expected to be up. Based on these parameters the following test is applied:

If N has a caption then
Let E(K1) be the edge image of frame K1=ceiling(N-D/2)
Let E(K2) be the edge image of frame K2=floor(N+D/2)
Let E'=E(N)^E(K1) where^is the logical AND operation
Let E"=E(N)^E(K2)
Let R1=1 if E' has a caption or 0 otherwise
Let R2=1 if E" has a caption or 0 otherwise
By definition, N is said to have a caption if R1=1 or R2=0
FIG. 4 illustrates the steps described above.

The procedure described herein detects a caption using the three basic characteristics described above, i.e., captions do not move, they remain on the screen for at least a minimum period of time, and they are intended to be read from a distance. It is also possible to use additional information about the domain associated with the video to enhance the efficiency of the procedure. In particular, the information of the approximate location of the caption within the frame, enables the algorithm to focus on specific areas of the image (e.g., the bottom half) with the corresponding reduction in processing requirements.

This approach can be taken a step further if the type of caption being sought is known exactly or almost exactly. For example, in sporting events the score of a match is typically reported constantly throughout the broadcast. In this case a simpler matching algorithm can be used in conjunction with the confirmation step.

More specifically, let I be an image containing the caption of interest and E(I) is its corresponding edge image. A video frame N, with edge image E(N), will contain an occurrence of the caption if E(N)^E(I) has a caption.

Given a frame containing a caption, the next step is to interpret the text contained in the caption. The task involves locating the area or areas of interest, separating them from the rest of the image, and applying OCR. The first two steps are relatively straightforward given the information obtained from the connected component analysis performed during the detection phase. However, applying OCR, is a more difficult task, particularly if the caption background is transparent, or even translucid, because the letters in the text will blend with the scene.

The problem of interpreting text in gray-scale or color images has been studied in the literature, most recently in Ohya, J., Shio, A., Akamatsu, S. "Recognizing Characters in Scene Images", IEEE Transactions on Pattern Analysis and Machine Intelligence, Vol. 16, No. 2, pp. 214–220, whereof the disclosure, to the extent it does not conflict with the present disclosure, is herein incorporated by reference. In principle, this work could be used to interpret captions if one frame at a time is considered. However, the presumption about a solid background behind the text cannot always be met in video. Instead, one must deal with characters that blend with the scene. The same observation applies to techniques for interpreting text in video found in the context of industrial and surveillance applications (Nakamura, Y. et al. "An optical character recognition system for Industrial Applications: TOSEYE-1000," Proceedings Intl. Workshop on Industrial Applications of Machine Vision and Machine Intelligence, 1987, pp. 364–368) and licence plate identification (Takatoo M. et al., "Grey scale image processing technology applied to a vehicle license number recognition system," Proceedings Intl. Workshop on Industrial Applications of Machine Vision and Machine Intelligence, 1987, pp. 364–368, and Howington L. C., "Automated license plate reading," Advanced Imaging, Vol.4, No. 8, 1989, pp 46–50).

Figure 5:
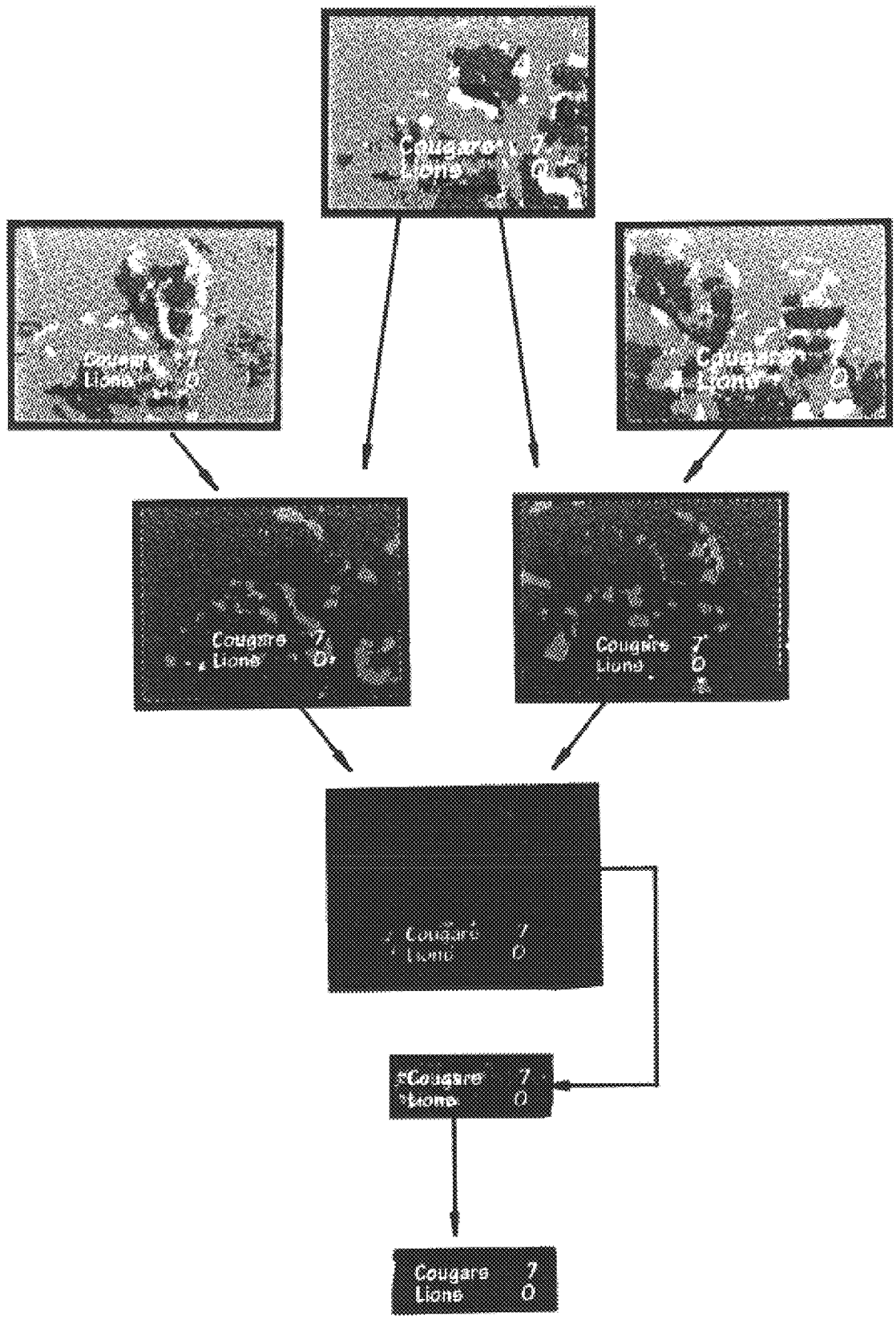
FIG. 5 shows background removal for optical character recognition in accordance with the invention.

The solution herein disclosed involves taking advantage of motion and color to remove objects in the background. The basic premises upon which this solution is based are: (1) captions are displayed using saturated colors; and (2) there is motion on the scene behind the captions. The technique is similar to that used in the confirmation step of the capture detection algorithm, but this time the color images themselves are considered. In particular, motion and color information is utilized as follows:

Let N, N-x and N+x be three frames containing the same caption; the value of x should be as large as possible, but all three frames must contain the same caption. Let RGB(N,i,j) be the rgb color values for the i-th pixel of row j in frame N. Let HSV(N,i,j) be the corresponding values in the hue-saturation color model. A new color image I is constructed by multiplying the HSV values of N, N-x and N+x, and then normalizing to the maximum value. The resulting image will highlight saturated values that remain in the same location, fading all other values. FIG. 5 illustrates the process when applied to the frames shown in FIG. 4. The binary image at the end of the sequence was obtain by threshholding the saturation values of the results.

It is also helpful in gaining a fuller understanding of the invention to consider the method in accordance with the invention in terms of a series of flow charts.

Figure 6:
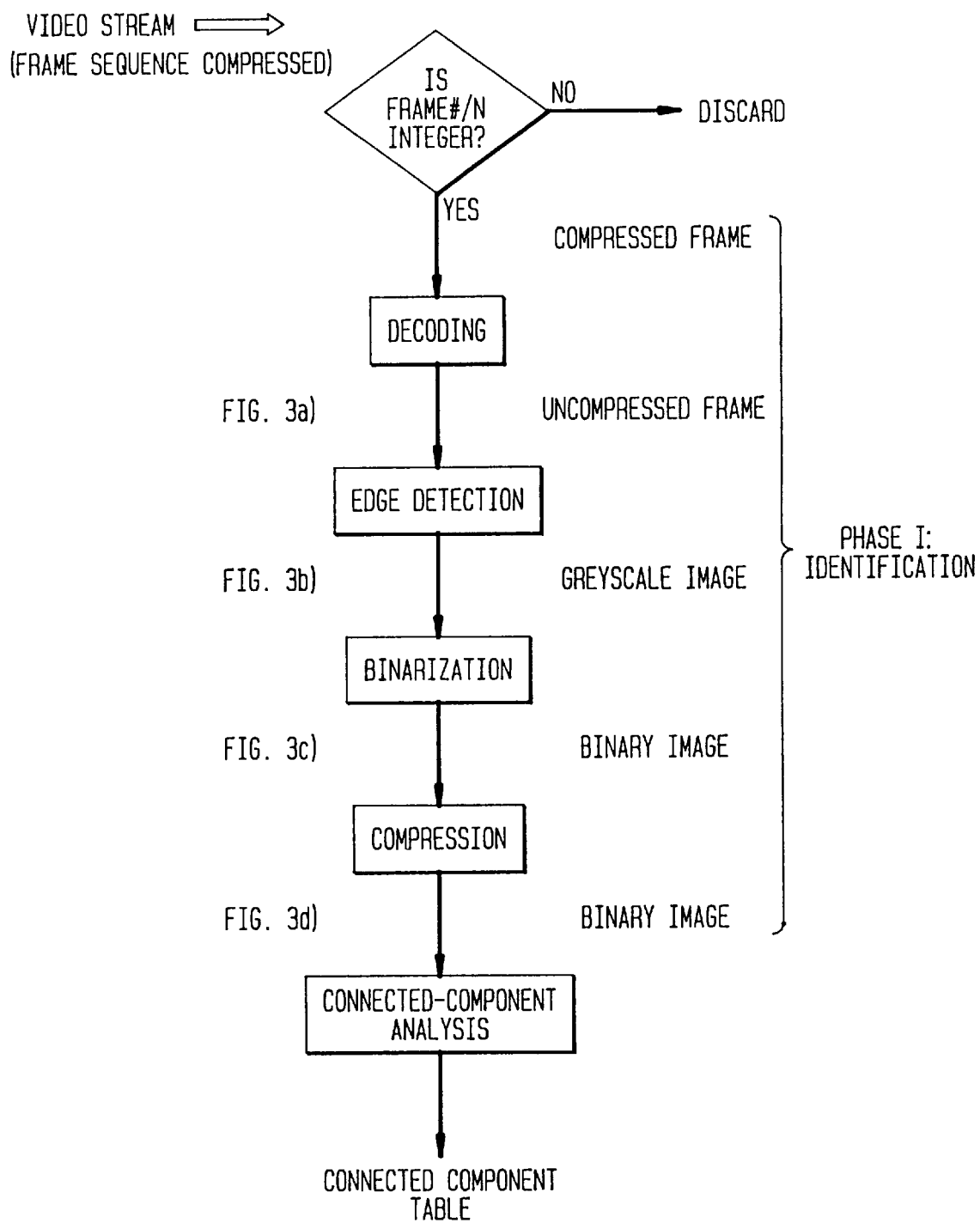

Referring now to the flow chart of FIG. 6 in accordance with an exemplary embodiment of the invention, the input is in the form of an encoded video stream.

Step 1, sampling, involves selecting frames for video analysis. A sampling rate is fixed at 1 frame per N, where N is the number of consecutive frames in which the same caption is expected to appear.

Step 2, decoding, involves converting each of the selected frames into a digitized color image. A current implementation of the uses motion JPEG encoding. However, the same technique can be applied using MPEG or another other encoding mechanism. The preferred format of the resulting color image is a 24-bit RGB format.

Step 3, edge detection, uses the algorithm described in "Digital Image Processing", by Gonzales and Wintz.

Step 4, binarization, converts the greyscale image generated in Step 3 into a bi-level image by means of a thresholding operation.

Step 5, compression, groups consecutive pixel values in the binary image—eight at a time—and maps them into a binary value by means of the test described above in relation to compression, that is, during this step the binary edge image of a frame, which size is defined to be WIDTH× HEIGHT, is converted into an image of size WIDTH/8× HEIGHT by compressing each byte in the original image (8 continuous pixels) into a binary value using the criteria given above.

Step 6, connected component analysis, separates groups of connected pixels and determines whether they are likely to be part of a text region in the image or not. The algorithm takes a binary image as input and produces a table of connected-components formatted as follows:

| Component ID | EnclosingRectangle | Dimensions | Density |
| --- | --- | --- | --- | where Component ID is an integer, Enclosing rectangle are the coordinates of the smallest rectangle containing all the pixels in the component (minX, minY, maxX, maxY), dimensions are measurements of the width, height and area of the enclosing rectangle, and density is the ratio of black pixels, which are associated with edges, in the component.

Figure 7:
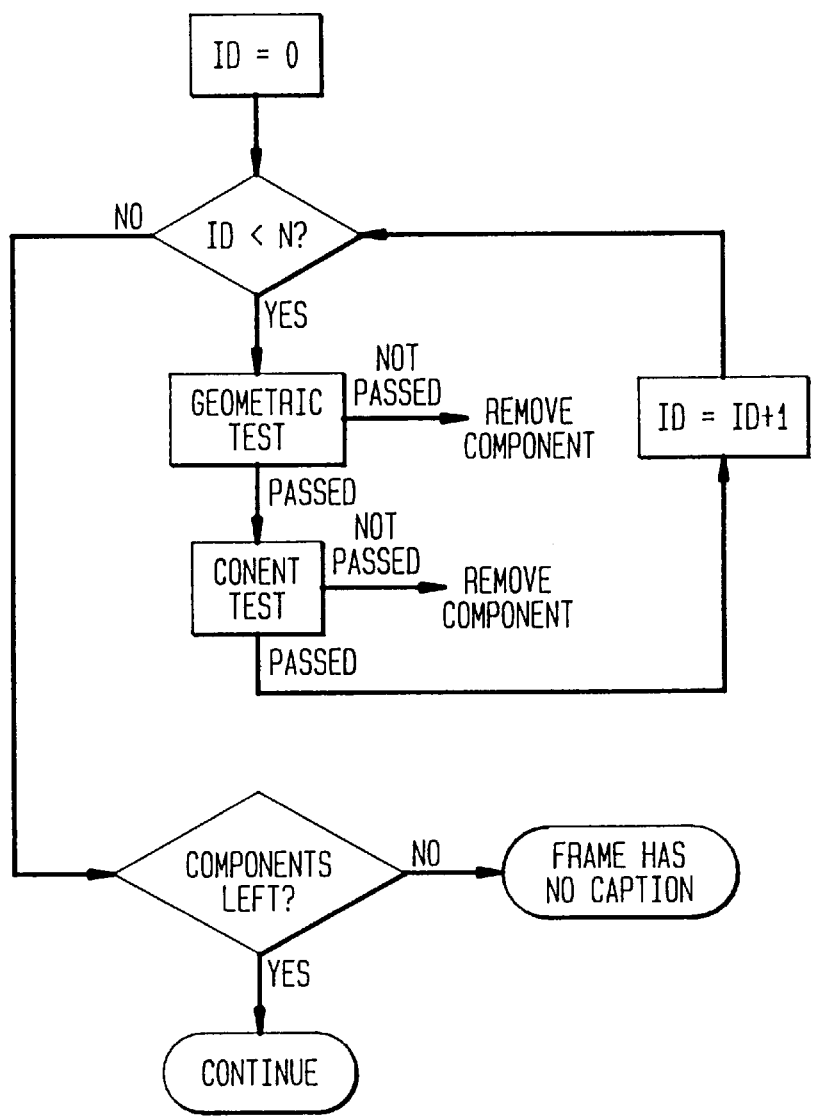

The algorithm corresponding to the flow chart of FIG. 7 is used to determine whether the connected component is likely to contain edges associated with text or not. The following steps are performed for each component:

Step 1, a geometric test, compares the width, height, and area of the component against predefined minima and maxima, discarding the component if any of the conditions is violated.

Step 2, a content test, is applied to connected components that pass the geometric test. This test involves comparing the density of the component against predefined upper and lower bounds, as verifying that a minimum number of vertical white runs, corresponding to the gaps that occur between letters, exist.

Figure 8:
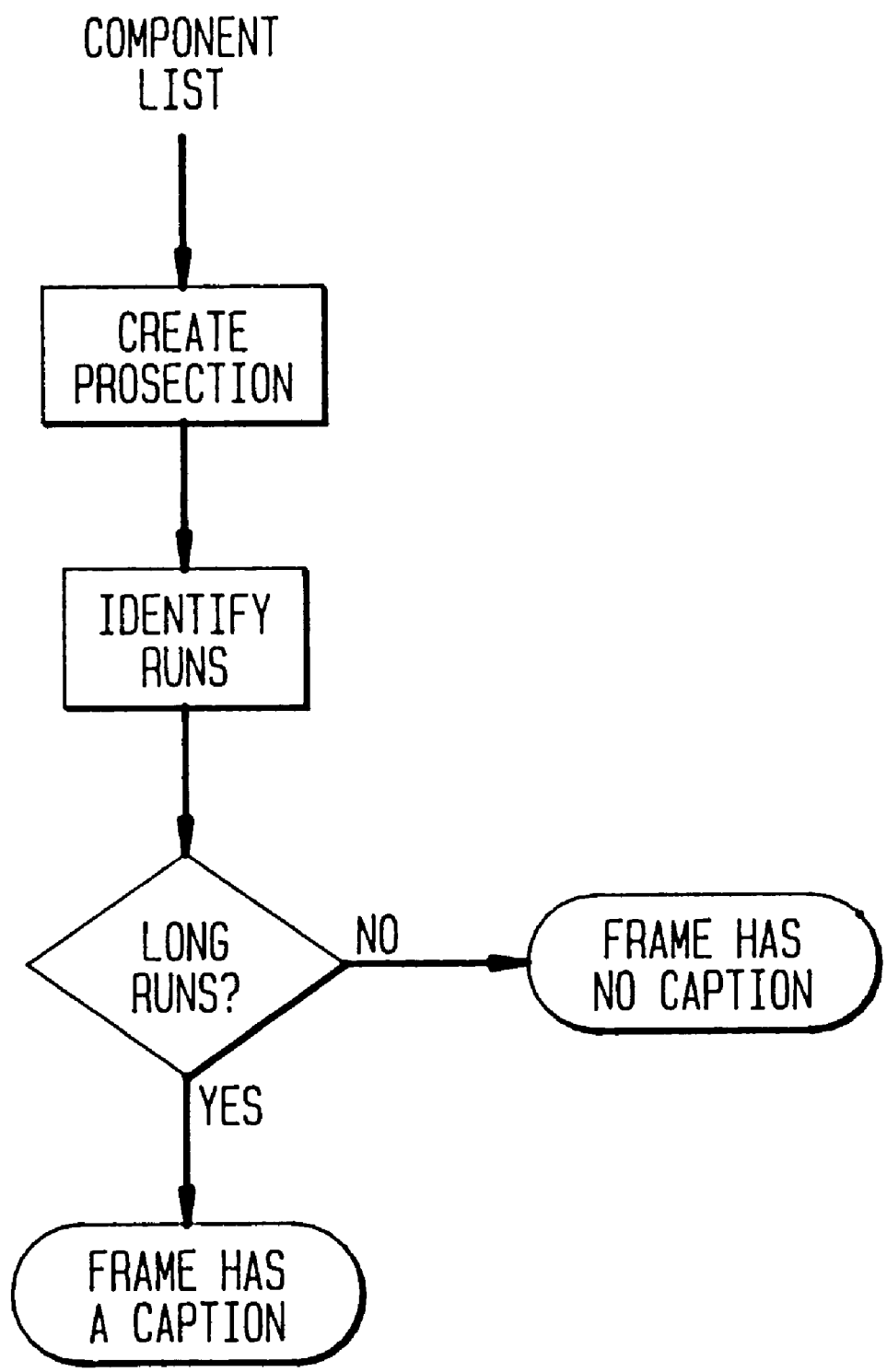

The final step in this portion of the algorithm, as shown in FIG. 8, involves projecting the black pixels contained in the connected components that passed the geometric and content tests into the Y-axis of the image. The resulting projection pattern is then tested to determine if its vertical runs, defined a sequences of consecutive lines having counts greater than zero, exceed the minimum height of the characters being sought in the caption.

The binary image, and its corresponding video frame, is considered to have a caption if and only if it has at least one run satisfying the minimum text height condition.

This completes the first phase of the algorithm.

Figure 9:
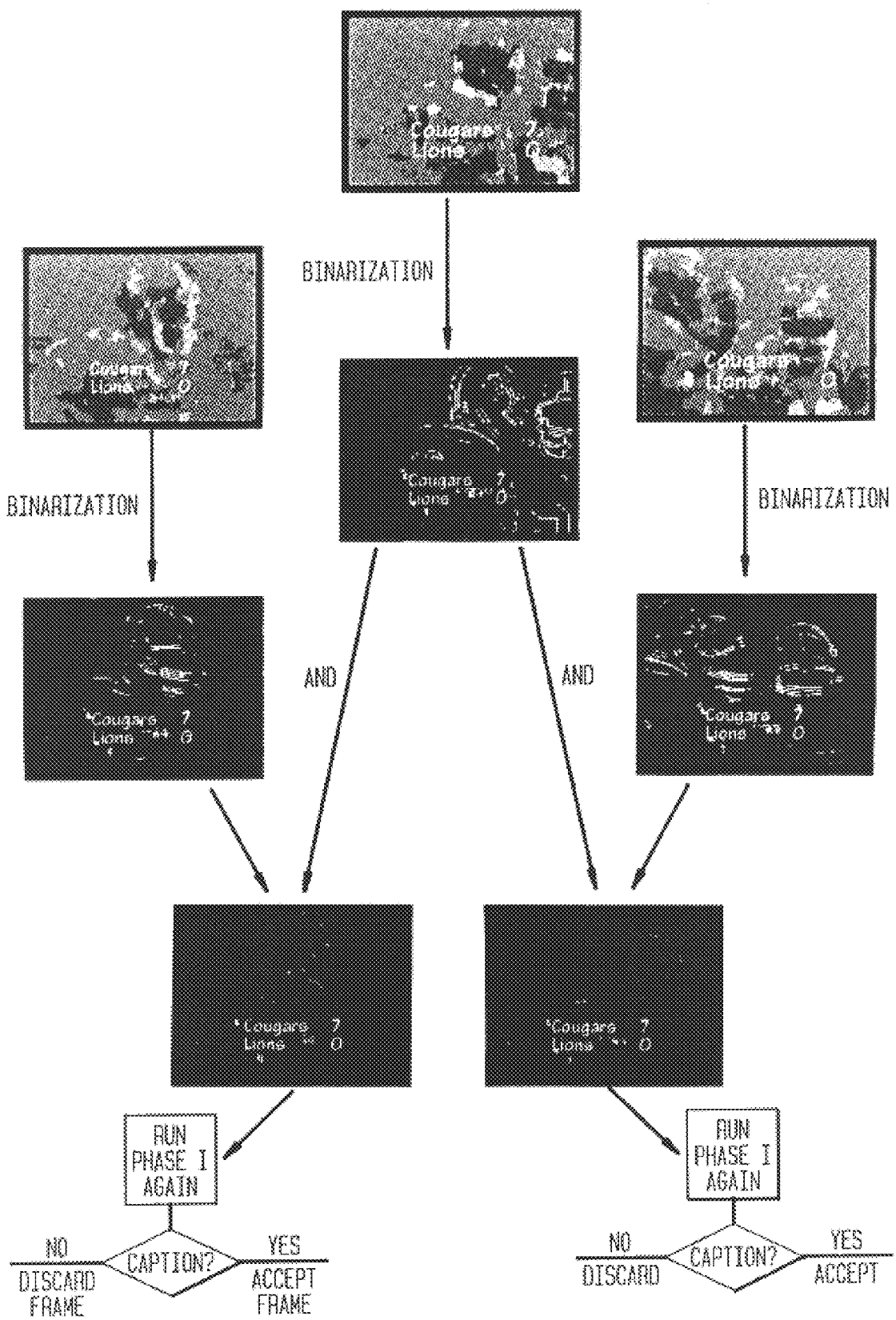

The flow chart in FIG. 9 illustrates the confirmation step. During this step the collection of frames determined in phase I to have captions is further processed to confirm the result.

Let N be a frame thought to have a caption.

The first part of this test involves applying the decoding, edge detection and binarization steps described above to frames N−D/2 and N+D/2. The resulting images are then combined with the binary image of N using an AND operation. The result of this operation are two new binary images in which some of the edges associated with the individual frames have been removed, but those associated within text remain.

The second part of the confirmation step involves applying the compression, connected component analysis and projection evaluation steps described above to each of the two new binary images.

Finally, a frame is said to have a caption, if and only if, either one, or both of the new images is determined to have a caption.

The flow chart in FIG. 10 shows the process as applied to frames containing captions to separate the text from the rest of the scene. The technique used also exploits motion in the image to improve the quality of the results. In this case the color images themselves, not the edges, are combined using this time and addition operations that first adds the values of corresponding pixels in the two images and then normalizes them with respect to the highest pixel value. The effect of this operation is to darken pixels with low intensity values, and to enhance pixels with high intensity values such as those typically found in captions.

The two images obtained in the first step are combined using the same technique to obtain a third color image in which the background is likely to be darkened even more. This image is converted to grey-scale and binarized and yielding a black and white image which can the enhanced and passed to an OCR system. The resulting text strings serve as indices into the content of the video.

It will be understood that the invention has been described by way of illustrative examples without it being thereby limited. Various modifications will be apparent to one of skill in the art to which the invention pertains without departing from the spirit and teaching of the invention. Such changes are intended to be within the scope of the claims following.

What is claimed is:

1. A computer-implemented method for the identification and interpretation of text captions in an encoded video stream of digital video signals, said method comprising:
sampling by selecting frames for video analysis;
decoding by converting each of said frames selected into a digitized color image;
performing edge detection for generating a gray scale image;
binarizing by converting said gray scale image into a bi-level image by means of a thresholding operation;
compressing groups of consecutive pixel values in said binary image;
mapping said consecutive pixel values into a binary value; and
separating groups of connected pixels and determining whether they are likely to be part of a text region in the image or not.

2. A computer-implemented method for the identification and interpretation of text captions as recited in claim 1, wherein said sampling is at a sampling rate fixed at 1 frame per N, where N is the number of consecutive frames in which the same caption is expected to appear.

3. A computer-implemented method for the identification and interpretation of text captions as recited in claim 1, wherein said decoding uses one of JPEG encoding and MPEG.

4. A computer-implemented method for the identification and interpretation of text captions as recited in claim 3, wherein the format of the resulting color image is a 24-bit RGB format.

5. A computer-implemented method for the identification and interpretation of text captions as recited in claim 1, wherein said compressing groups is performed eight at a time.

6. A computer-implemented method for the identification and interpretation of text captions as recited in claim 1, wherein said mapping of said pixel values is performed by means of a test wherein during this step a binary edge image of a frame, which size is defined to be WIDTH×HEIGHT, is converted into an image of size WIDTH8×HEIGHT by compressing each byte in the original image (8 continuous pixels) into a binary value in accordance with predetermined criteria.

7. A computer-implemented method for the identification and interpretation of text captions as recited in claim 6, wherein said criteria comprise a) 2<# of white pixels<6; and b) at least 2 of the 4-connected neighbors are 1.

8. A computer-implemented method for the identification and interpretation of text captions as recited in claim 1, including the step of taking a binary image as input and producing a table of connected-components formatted as follows:

| Component ID | EnclosingRectangle | Dimensions | Density |
|---|---|---|---| where Component ID is an integer, Enclosing rectangle are the coordinates of the smallest rectangle containing all the pixels in the component (minX, minY, maxX, maxY), dimensions are measurements of the width, height and area of the enclosing rectangle, and density is the ratio of black pixels, which are associated with edges, in the component.

9. A computer-implemented method for the identification and interpretation of text captions as recited in claim 8, comprising a step of determining whether a connected component is likely to contain edges associated with text or not, said step comprising the steps of:

(a) a geometric test, comparing the width, height, and area of said component against predefined minima and maxima, and discarding the component if any of the conditions is violated, and (b) a content test applied to connected components that pass the geometric test, comparing the density of said component against predefined upper and lower bounds, as verifying that a minimum number of vertical white runs, corresponding to the gaps that occur between letters, exist.

10. A computer-implemented method for the identification and interpretation of text captions as recited in claim 9, comprising the steps of:

projecting black pixels contained in connected components that passed said geometric and content tests into the Y-axis of the image, thereby producing a projection pattern; and testing said resulting projection pattern to determine if its vertical runs, defined as sequences of consecutive lines having counts greater than zero, exceed a minimum height of the characters being sought in the caption.

11. A computer-implemented method for the identification and interpretation of text captions as recited in claim 10, including the step of defining said binary image, and its corresponding video frame, as having a caption if and only if it has at least one run satisfying said minimum text height condition.

12. A computer-implemented method for the identification and interpretation of text captions as recited in claim 11, wherein, when said binary image and its corresponding video frame is defined as having a caption, confirming the results by the steps of:

defining N to be a frame determined to have a caption;

applying said decoding, edge detection and binarization steps to frames N−D/2 and N+D/2 wherein D is the minimum number of contiguous frames a caption is expected to appear;

combining resulting images with a binary image of N using an AND operation so as to reesult in two new binary images in which some of the edges associated with the individual frames have been removed, but those associated with text remain;

applying said compression, projecting black pixels, and testing projection pattern steps to each of said two new binary images; and determining a frame to have a caption, if and only if, either one, or both of said two new images is determined to have a caption.

13. A computer-implemented method for the identification and interpretation of text captions as recited in claim 1, including the step of applying optical character recognition (OCR) to a portion of located text so as to interpret said text.

14. A computer-implemented method for the identification and interpretation of text captions in a video stream wherein the frame sequence is compressed, comprising the steps of:

determining whether the frame number divided by a predetermined number N is an integer, discarding non-integers;

decoding compressed frames so as to result in uncompressed frames;

detecting edges so as to derive a corresponding gray scale image;

binarizing said gray scale image so as to derive a binary image;

compressing said binary image so as to derive a compressed binary image; and performing a connected component analysis.

15. A computer-implemented method for the identification and interpretation of text captions as recited in claim 14, wherein said connected components analysis is carried out by computing connected components using a standard 4-neighbor connectivity text.

16. A computer-implemented method for the identification and interpretation of text captions as recited in claim 15, wherein each said computed connected component is subjected to two sets of tests involving its geometric properties and contents.

17. A computer-implemented method for the identification and interpretation of text captions as recited in claim 16, wherein said geometric tests involve minimum and maximum boundaries on a respective connected component's width, height and area.

18. A computer-implemented method for the identification and interpretation of text captions as recited in claim 16, wherein said content tests, applied to an area in said binary image following edge detection corresponding to said connected component, include upper and lower boundaries on the proportion of black pixels contains therein, and a threshold on the number of vertical zero-runs, defined as collections of one or more columns in which no black pixels occur.

19. A computer-implemented method for the identification and interpretation of text captions as recited in claim 18, comprising the steps of:

separating out connected components that passed said tests; and projecting values of corresponding pixels in said binary image following edge detection into the vertical axis of the image so as to result in a projection pattern.

20. A computer-implemented method for the identification and interpretation of text captions as recited in claim 19, comprising the steps of testing said projection pattern to determine if it contains runs that exceed a given threshold and thereby determine if a caption is present.

21. A computer-implemented method for the identification and interpretation of text captions in an encoded video stream of digital video signals, said method comprising:

sampling by selecting frames for video analysis;

decoding by converting each of frames selected into a digitized color image;

separating each said digitized color image into three color images corresponding to three color planes;

performing edge detection on each of said color planes for generating a respective gray scale image for each of said color planes;

applying a thresholding image to each of said gray scale images so as to produce three respective binary edge images;

combining said three binary edge images to obtain a single combined binary edge image;

compressing groups of consecutive pixel values in said combined binary image;

mapping said consecutive pixel values into a binary value; and separating groups of connected pixels and determining whether they are likely to be part of a text region in the image or not.

22. A computer-implemented method for the identification and interpretation of text captions as recited in claim 21, wherein said digitized color image is separated into three 8-bit color images corresponding to said three color planes.

23. A computer-implemented method for the identification and interpretation of text captions as recited in claim 22, wherein said three color planes are respectively red, green, and blue (RGB).

24. A computer-implemented, method for the identification and interpretation of text captions which are embedded in one or more of a plurality of contiguous frames of encoded digital video signals, said method comprising:

sampling by selecting one or more of said frames for video analysis, said sampling being at a sampling rate fixed at 1 frame per N, where N is the number of consecutive frames in which a given text caption is expected to appear;

decoding by converting each of said frames selected into a digitized color image;

performing edge detection for generating a gray scale image;

binarizing by converting said gray scale image into a bi-level image by means of a thresholding operation;

compressing groups of consecutive pixel values in said binary image;

mapping said consecutive pixel values into a binary value; and separating groups of connected pixels and determining whether they are likely to be part of a text region embedded in the image or not.

* * * * *